US012572632B2

(12) United States Patent
Kling et al.

(10) Patent No.: US 12,572,632 B2
(45) Date of Patent: Mar. 10, 2026

(54) SYSTEMS AND METHODS FOR DATA SECURITY MODEL MODIFICATION AND ANOMALY DETECTION

(71) Applicant: BANK OF AMERICA CORPORATION, Charlotte, NC (US)

(72) Inventors: John Howard Kling, Cincinnati, OH (US); Charles Edward Dudley, Concord, NC (US); Jason T. Yeung, Forest Hills, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 199 days.

(21) Appl. No.: 18/376,130

(22) Filed: Oct. 3, 2023

(65) Prior Publication Data
US 2025/0112941 A1      Apr. 3, 2025

(51) Int. Cl.
*G06F 21/30*        (2013.01)
*H04L 9/40*        (2022.01)

(52) U.S. Cl.
CPC ............ *G06F 21/30* (2013.01); *H04L 63/105* (2013.01); *H04L 63/1425* (2013.01)

(58) Field of Classification Search
CPC ............. G06F 21/31; G06F 2221/2141; H04L 63/101; H04L 63/105; H04L 63/10; H04L 63/1425
See application file for complete search history.

(56) References Cited

U.S. PATENT DOCUMENTS

| | | | | |
|---|---|---|---|---|
| 11,334,661 B1 * | 5/2022 | Brandwine | ........... | H04W 12/04 |
| 11,416,561 B1 * | 8/2022 | Satish | ................... | H04L 63/105 |
| 11,689,534 B1 * | 6/2023 | Smith | ................... | G06F 21/604 |
| | | | | 726/4 |
| 2001/0020254 A1 * | 9/2001 | Blumenau | ........... | G06F 21/6218 |
| | | | | 707/999.1 |
| 2015/0121500 A1 * | 4/2015 | Venkatanaranappa | ...................... | |
| | | | | H04L 63/0815 |
| | | | | 726/8 |

(Continued)

OTHER PUBLICATIONS

Mayrhofer et al., "The Android Platform Security Model," Apr. 2021 ACM Transactions on Privacy and Security (TOPS), vol. 24, Issue 3 Article No. 19, pp. 1-35.*

(Continued)

*Primary Examiner* — Roderick Tolentino

(74) *Attorney, Agent, or Firm* — Moore & Van Allen PLLC; Michael M. McCraw

(57)                ABSTRACT

Systems, methods, and computer program products are provided herein for data security model modification and anomaly detection. An example method includes receiving a model input associated with one or more data entries of a data security model and accessing the data security model. The data security model includes a plurality of data objects including one or more data entries where each data object defines an associated model level indicative of the hierarchical position of the data object within the data security model and one or more links between the data objects that define data object interdependency parameters. The example method further includes determining one or more data objects of the data security model implicated by the model input and modifying one or more data entries of the one or more implicated data objects of the data security model in response to the model input.

20 Claims, 7 Drawing Sheets

(56)  References Cited

U.S. PATENT DOCUMENTS

| 2020/0252213 A1* | 8/2020 | Vijayan | ................. | G06F 16/275 |
| 2022/0286465 A1* | 9/2022 | Du | ........................... | H04L 63/08 |
| 2023/0401332 A1* | 12/2023 | Vahidnia | ............... | H04L 63/101 |
| 2024/0143824 A1* | 5/2024 | Brenner | ................ | G06F 16/245 |
| 2024/0291824 A1* | 8/2024 | Murray | ................. | H04L 63/104 |

OTHER PUBLICATIONS

Fei et al., "A Systematic Review of IoT Security: Research Poten-
tial, Challenges, and Future Directions," Nov. 2023 ACM Comput-
ing Surveys, vol. 56, Issue 5 Article No. 111, pp. 1-40.*

\* cited by examiner

RECEIVE A MODEL INPUT ASSOCIATED WITH ONE OR MORE DATA ENTRIES OF A DATA SECURITY MODEL
302

ACCESS THE DATA SECURITY MODEL
304

DETERMINE ONE OF MORE DATA OBJECTS OF THE DATA SECURITY MODEL IMPLICATED BY THE MODEL INPUT
306

DETERMINE A FIRST DATA OBJECT OF THE DATA SECURITY MODEL IMPLICATED BY THE MODEL INPUT
308

MODIFY ONE OR MORE DATA ENTRIES OF THE FIRST DATA OBJECT IN RESPONSE TO THE MODEL INPUT
310

DETERMINE A SECOND DATA OBJECT OF THE DATA SECURITY MODEL BASED UPON A FIRST SET OF DATA OBJECT INTERDEPENDENCY PARAMETERS OF A FIRST LINK BETWEEN THE FIRST DATA OBJECT AND THE SECOND DATA OBJECT
312

MODIFY ONE OR MORE DATA ENTRIES OF THE SECOND DATA OBJECT
314

FIG. 3

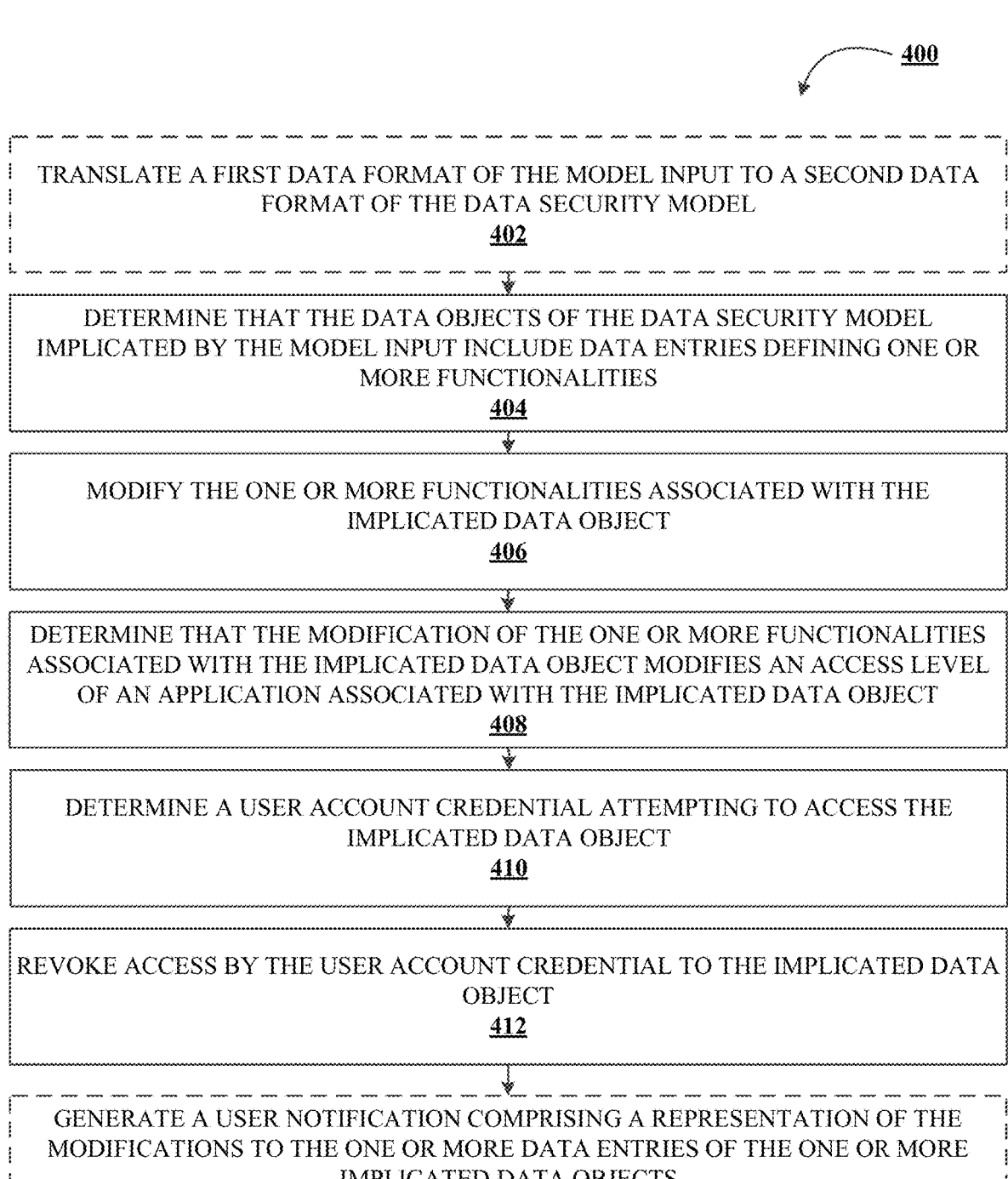

400

TRANSLATE A FIRST DATA FORMAT OF THE MODEL INPUT TO A SECOND DATA
FORMAT OF THE DATA SECURITY MODEL
402

DETERMINE THAT THE DATA OBJECTS OF THE DATA SECURITY MODEL
IMPLICATED BY THE MODEL INPUT INCLUDE DATA ENTRIES DEFINING ONE OR
MORE FUNCTIONALITIES
404

MODIFY THE ONE OR MORE FUNCTIONALITIES ASSOCIATED WITH THE
IMPLICATED DATA OBJECT
406

DETERMINE THAT THE MODIFICATION OF THE ONE OR MORE FUNCTIONALITIES
ASSOCIATED WITH THE IMPLICATED DATA OBJECT MODIFIES AN ACCESS LEVEL
OF AN APPLICATION ASSOCIATED WITH THE IMPLICATED DATA OBJECT
408

DETERMINE A USER ACCOUNT CREDENTIAL ATTEMPTING TO ACCESS THE
IMPLICATED DATA OBJECT
410

REVOKE ACCESS BY THE USER ACCOUNT CREDENTIAL TO THE IMPLICATED DATA
OBJECT
412

GENERATE A USER NOTIFICATION COMPRISING A REPRESENTATION OF THE
MODIFICATIONS TO THE ONE OR MORE DATA ENTRIES OF THE ONE OR MORE
IMPLICATED DATA OBJECTS
414

FIG. 4

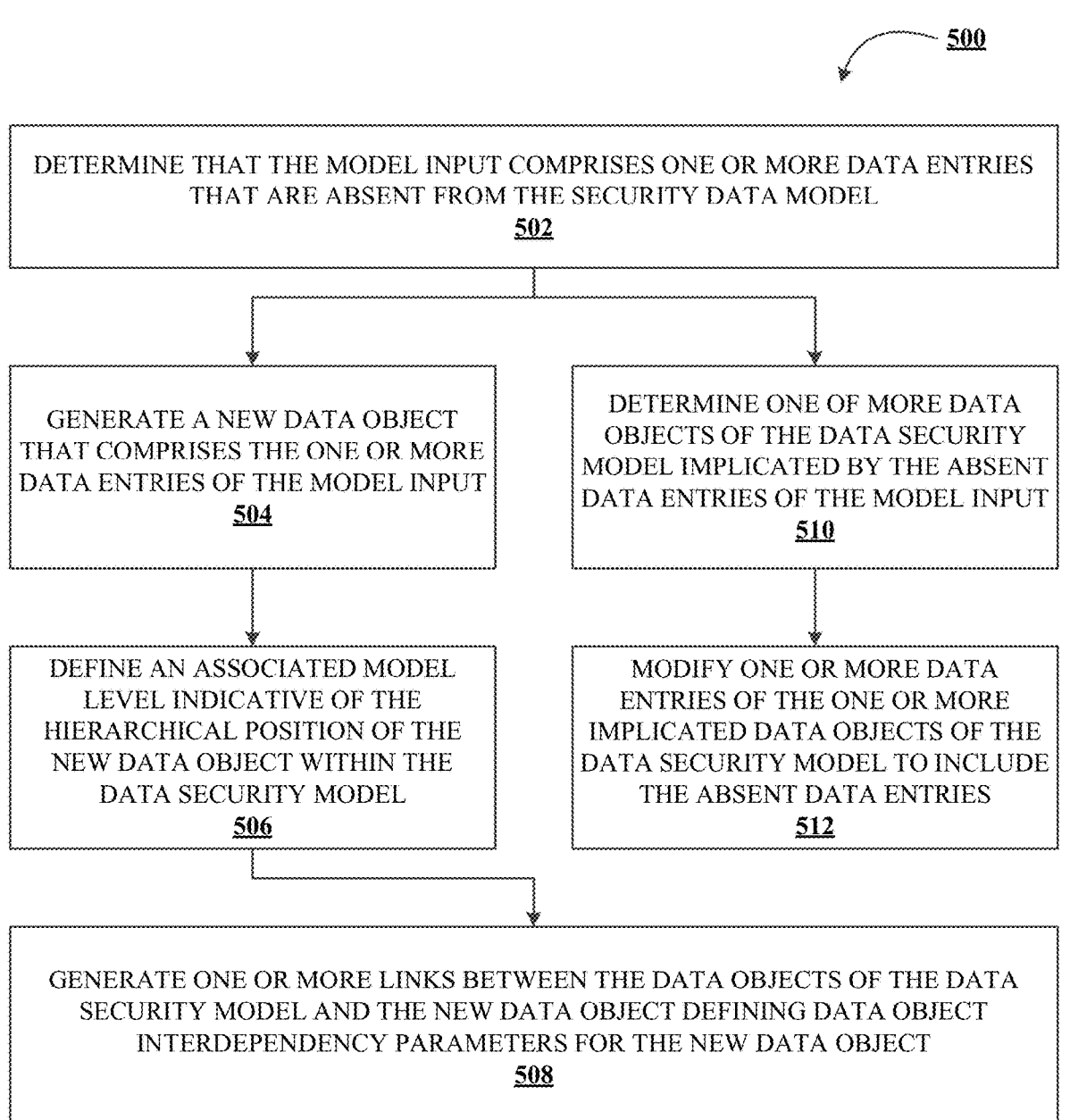

500

DETERMINE THAT THE MODEL INPUT COMPRISES ONE OR MORE DATA ENTRIES THAT ARE ABSENT FROM THE SECURITY DATA MODEL
502

GENERATE A NEW DATA OBJECT THAT COMPRISES THE ONE OR MORE DATA ENTRIES OF THE MODEL INPUT
504

DETERMINE ONE OF MORE DATA OBJECTS OF THE DATA SECURITY MODEL IMPLICATED BY THE ABSENT DATA ENTRIES OF THE MODEL INPUT
510

DEFINE AN ASSOCIATED MODEL LEVEL INDICATIVE OF THE HIERARCHICAL POSITION OF THE NEW DATA OBJECT WITHIN THE DATA SECURITY MODEL
506

MODIFY ONE OR MORE DATA ENTRIES OF THE ONE OR MORE IMPLICATED DATA OBJECTS OF THE DATA SECURITY MODEL TO INCLUDE THE ABSENT DATA ENTRIES
512

GENERATE ONE OR MORE LINKS BETWEEN THE DATA OBJECTS OF THE DATA SECURITY MODEL AND THE NEW DATA OBJECT DEFINING DATA OBJECT INTERDEPENDENCY PARAMETERS FOR THE NEW DATA OBJECT
508

FIG. 5

SYSTEMS AND METHODS FOR DATA SECURITY MODEL MODIFICATION AND ANOMALY DETECTION

TECHNOLOGICAL FIELD

Example embodiments of the present disclosure relate generally to distributed component computing environments and, more particularly, to systems and methods for data security model modification and anomaly detection within these environments.

BACKGROUND

Computing environments, networks, systems, etc. may include various computing devices that are connected together to perform common and/or distributed processes. For example, distributed computing components may be employed that are associated with distinct operational capabilities, requirements, characteristics, and/or the like and, by association, may implicate various subject matters, topics, concepts, and applications with particular controls and permissions. Applicant has identified a number of deficiencies and problems associated with conventional data models that are associated with these implementations. Through applied effort, ingenuity, and innovation, many of these identified problems have been solved by developing solutions that are included in embodiments of the present disclosure, many examples of which are described in detail herein.

BRIEF SUMMARY

Apparatuses, systems, methods, and computer program products are provided for data security model modification and anomaly detection. In one aspect, a system for data security model modification and anomaly detection is provided. The system may include at least one non-transitory storage device and at least one processor coupled to the at least one non-transitory storage device. The at least one processor may be configured to receive a model input associated with one or more data entries of a data security model and access the data security model. The data security model may include a plurality of data objects including one or more data entries where each data object defines an associated model level indicative of the hierarchical position of the data object within the data security model one or more links between the data objects that define data object interdependency parameters.

In some embodiments, the processor may be configured to determine a first data object of the data security model implicated by the model input and modify one or more data entries of the first data object in response to the model input.

In some further embodiments, the processor may be configured to determine a second data object of the data security model based upon a first set of data object interdependency parameters of a first link between the first data object and the second data object and modify one or more data entries of the second data object.

In some embodiments, at least one of the data objects of the data security model implicated by the model input may further include one or more data entries defining one or more functionalities associated with the implicated data object. In such an embodiment, the processor may be further configured to modify the one or more functionalities associated with the implicated data object.

In some further embodiments, the processor may be further configured to determine that the modification of the one or more functionalities associated with the implicated data object modifies an access level of an application associated with the implicated data object. In such a further embodiment, the processor may determine a user account credential attempting to access the implicated data object and revoke access by the user account credential to the implicated data object in an instance in which an access level associated with the user account credential fails to satisfy the modified access level of the application.

In some embodiments, the model input may include one or more data entries that are absent from the data security model. In such an embodiment, the processor may be configured to generate a new data object that includes the one or more data entries of the model input, define an associated model level indicative of the hierarchical position of the new data object within the data security model, and generate one or more links between the data objects of the data security model and the new data object defining data object interdependency parameters for the new data object.

Additionally or alternatively, in some embodiments, the processor may be configured to determine one of more data objects of the data security model implicated by the absent data entries of the model input and modify one or more data entries of the one or more implicated data objects of the data security model to include the absent data entries.

In any embodiment, the processor may be further configured to generate a user notification including a representation of the modifications to the one or more data entries of the one or more implicated data objects.

In any embodiment, the model input may be associated with a first data format and the data entries of the data object forming the data security model may be associated with a second data format, such that the processor is further configured to translate the first data format to the second data format.

In one aspect a computer program product for data security model modification and anomaly detection is provided. The computer program product may include a non-transitory computer-readable medium comprising code that, when executed, causes an apparatus to receive a model input associated with one or more data entries of a data security model, access the data security model where the data security model includes a plurality of data objects including one or more data entries where each data object defines an associated model level indicative of the hierarchical position of the data object within the data security model one or more links between the data objects that define data object interdependency parameters, determine one of more data objects of the data security model implicated by the model input and modify one or more data entries of the one or more implicated data objects of the data security model in response to the model input.

In one aspect, a method for data security model modification and anomaly detection is provided. The method may include receiving a model input associated with one or more data entries of a data security model, accessing the data security model where the data security model includes a plurality of data objects comprising one or more data entries, wherein each data object defines an associated model level indicative of the hierarchical position of the data object within the data security model and one or more links between the data objects that define data object interdependency parameters, determining one of more data objects of the data security model implicated by the model input, and modifying one or more data entries of the one or more implicated data objects of the data security model in response to the model input.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 3 illustrates a method for data security model modification and anomaly detection in accordance with one or more embodiments of the present disclosure;

FIG. 4 illustrates a method for functionality determinations and associated access revocation in accordance with one or more embodiments of the present disclosure; and FIG. 5 illustrates a method of new data object generation in accordance with one or more embodiments of the present disclosure.

DETAILED DESCRIPTION

Figure 1A:
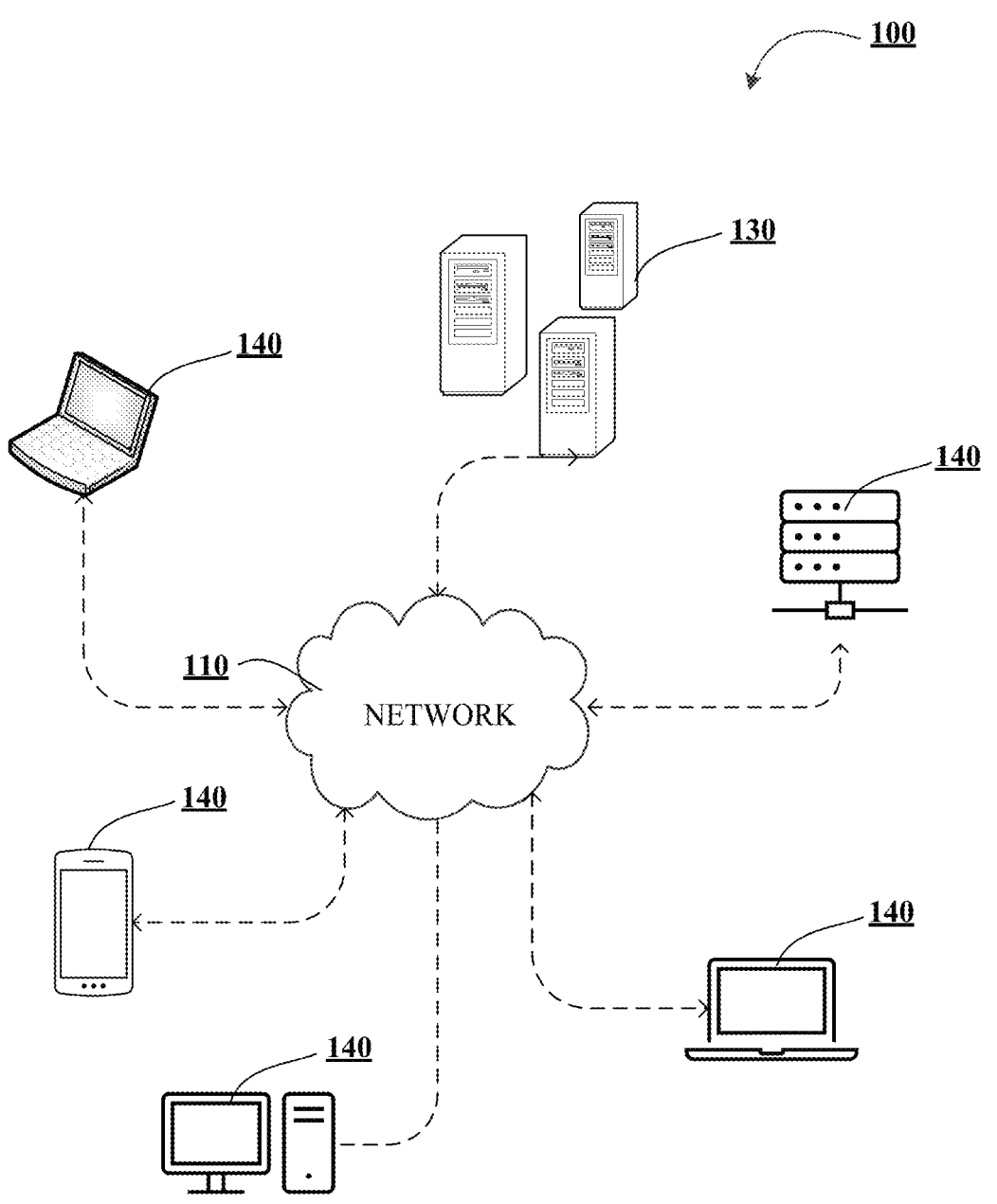
FIGS. 1A-1C illustrates technical components of an example distributed computing environment for data security model modification and anomaly detection in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users. In some embodiments, the systems described herein may generate a representation of at least a portion of a data security model (e.g., see FIG. 2 described hereafter). As such, the representation may refer to a user interface that is rendered for viewing by an associated user of the system and may further include one or more actionable inputs configured to receive an input from the user. In some embodiments, the user interface may operate to present one or more user notifications to the user that, for example, include a representation of one or more modifications made to the data security model (e.g., a modification to one or more data entries and/or data objects of the model).

As used herein, an "engine," "module" and/or "subsystem" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, computing environments, networks, systems, and the like may include various computing devices that are connected together to perform common and/or distributed processes. For example, distributed computing components may be employed that are associated with distinct operational capabilities, requirements, characteristics, etc. Furthermore, a particular computing environment associated with an entity may include various applications, programs, processes, etc. that implicate a variety of subject matters, topics, concepts, functionalities, and/or the like. Each of these subject matters, topics, concepts, functionalities, etc. may also be associated with particular security parameters, controls, and/or permissions that at least partially regulate their associated interactions. Conventional data security implementations, however, lack an encompassing, acceptably detailed, and dynamically modifiable data structure that collects and relates the various subject matters, topics, concepts, and/or functionalities relevant to these implementations. Said differently, conventional data security solutions are incomplete, inconsistent, and fail to properly account for the interdependencies prevalent within these implementations. Furthermore, these conventional models are often stagnant or otherwise incapable of dynamic modification to not only to the underlying data entries but also their interdependencies.

To solve these issues and others, the embodiments of the present disclosure may leverage a dynamically modifiable data security model that includes a plurality of data objects formed of data entries that further define an associated model level indicative of the hierarchical position of the data object within the data security model. The data security model described hereinafter may further include links between the data objects that define data object interdependency parameters. In operation, various model inputs may be received (e.g., new applications, new subject areas, new concepts, new functionality, etc.), and the systems of the present disclosure may determine data objects of the data security model implicated by the model input and modify data entries of the one or more implicated data objects of the data security model in response to the model input. In some instances, the modification to the data security model may result in modification to underlying functionality associated with various applications of the system. In order to ensure consistent data security, the embodiments of the present disclosure may further operate to dynamically allow or revoke user access to particular applications to account for the dynamic modification to the functionalities defined by the data security model. Unlike conventional solutions, the systems described herein may further operate to provide novel anomaly detection features, such as the detection of anomalies in the data security model and/or discrepancies between the data security model and 3$^{rd}$ party products.

Figure 1B:
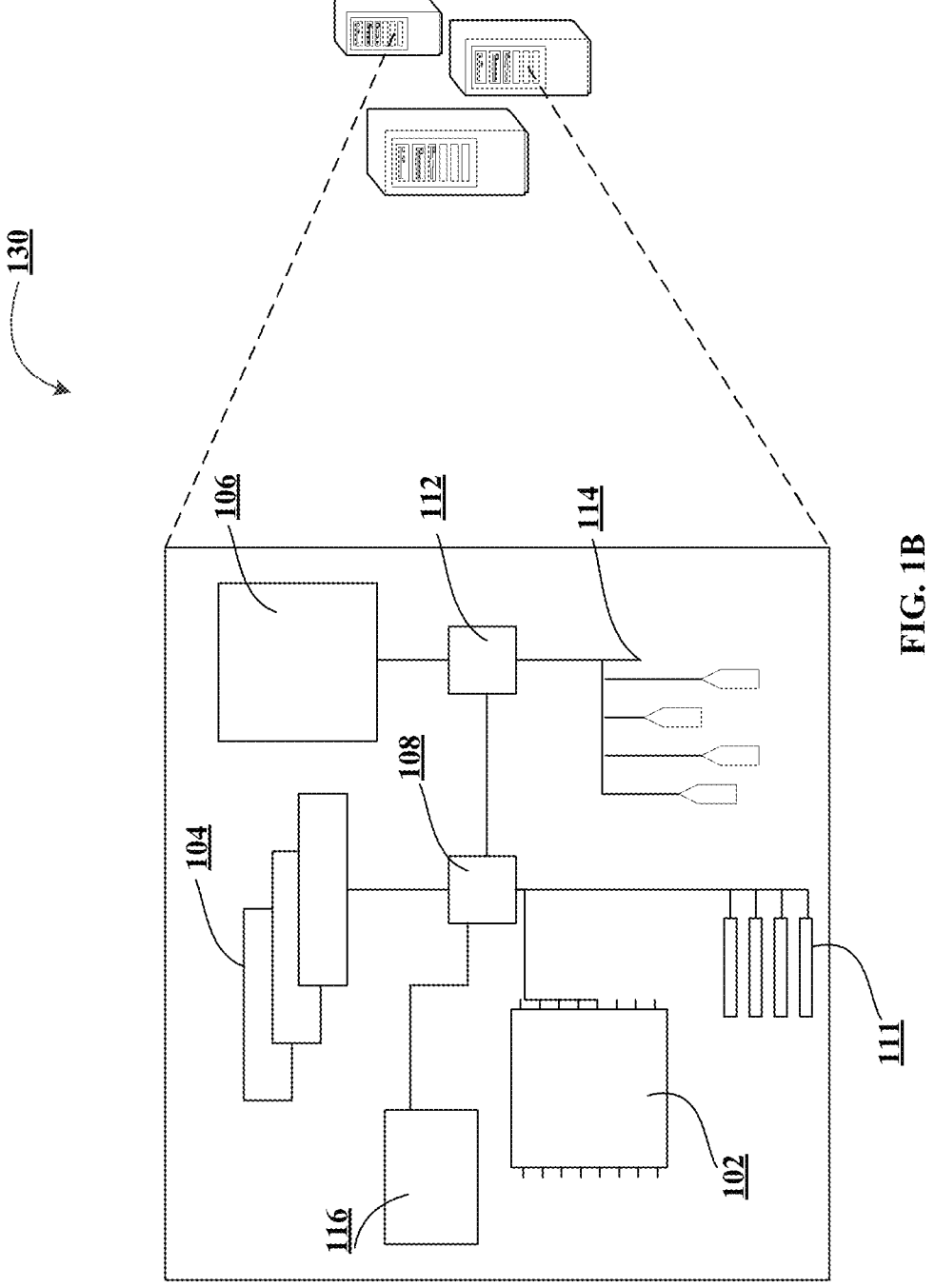
Figure 1C:
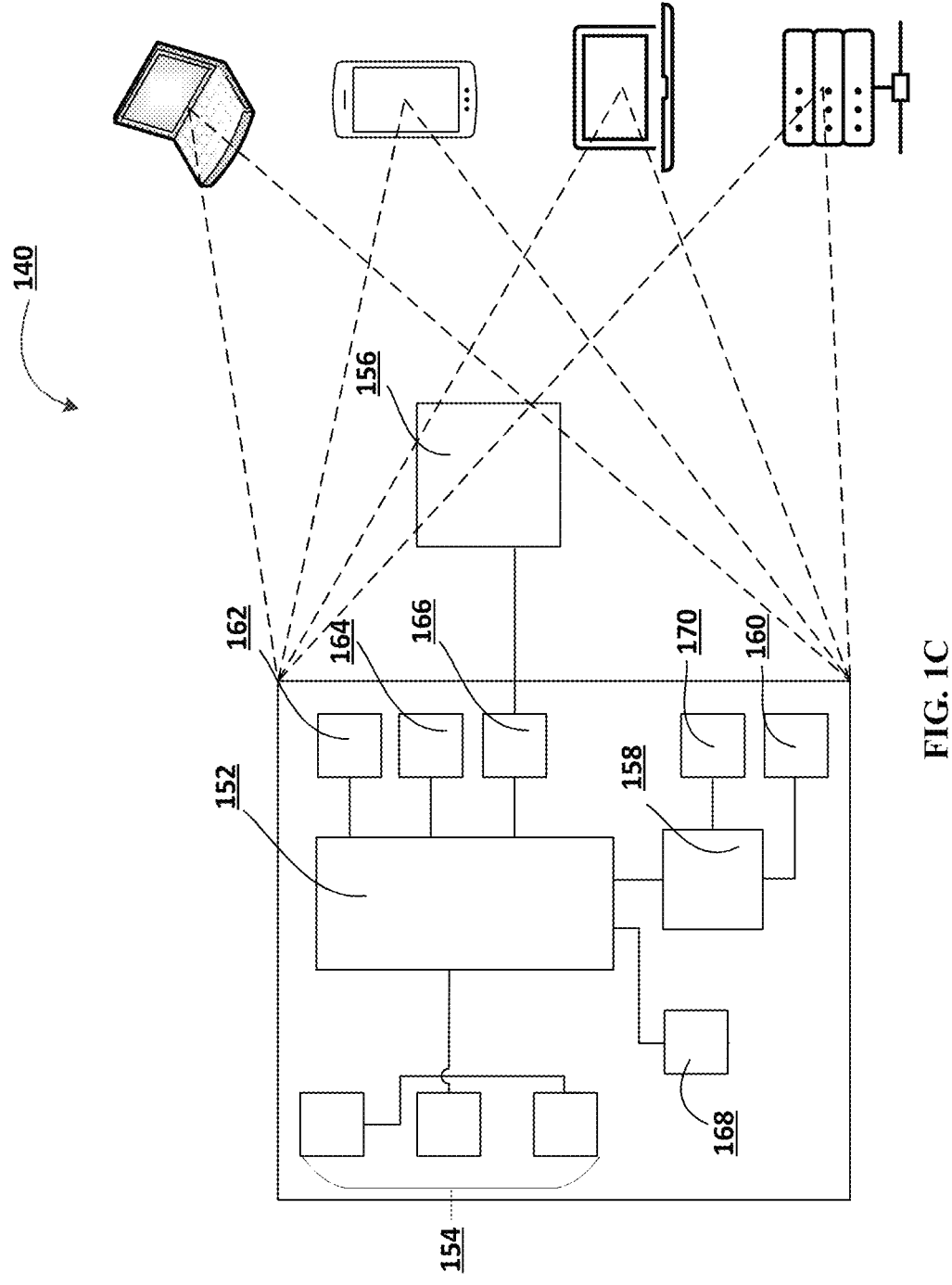

FIGS. 1A-1C illustrate technical components of an exemplary system for data security model modification and anomaly detection 100, in accordance with one or more embodiments of the present disclosure. As shown in FIG. 1A, the distributed computing environment 100 contemplated herein may include a system 130, distributed computing components 140, and a network 110 over which the system 130 and distributed computing components 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the distributed computing components 140 may define a client-server relationship in which the distributed computing components 140 are remote devices that request and receive service from a centralized server (e.g., the system 130). In some other embodiments, the system 130 and the distributed computing components 140 may have a peer-to-peer relationship in which the system 130 and the distributed computing components 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The distributed computing components 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., an automated teller machine (ATM)), and/or edge devices such as routers, routing switches, integrated access devices (IAD), and/or the like.

The present disclosure contemplates that the environment 100 may include any number of distributed computing components collectively illustrated and referred to herein as distributed computing components 140.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems, such as a machine learning subsystem, to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

As described hereinafter, the embodiments of the present disclosure may be described with reference to a data security model (e.g., a global information model, logical data model, or the like) that is formed of a plurality of data objects associated with data entries. The memory 104 and/or the storage device 106 described herein may be configured to store, in whole or in part, the data security model (e.g., model 200 in FIG. 2). In some embodiments, each data object forming the data security model may be stored by the memory 104 and/or the storage device 106 (e.g., a commonly stored model). In other embodiments, portions of the data security model may be collectively stored by the components forming the memory 104 and/or the storage device 106.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the distributed computing components 140, in accordance with one or more embodiments of the present disclosure. As shown in FIG. 1C, the distributed computing components 140 includes a processor 152, memory 154, an input/output device such as a display 156, a communication interface 158, and a transceiver 160, among other components. The distributed computing components 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the distributed computing components 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the distributed computing components 140, such as control of user interfaces, applications run by distributed computing components 140, and wireless communication by distributed computing components 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of distributed computing components 140 with other devices. External interface 168 may provide, for example, for wired communication in some implementations, or for wireless communication in other implementations, and multiple interfaces may also be used.

The memory 154 stores information within the distributed computing components 140. The memory 154 may be implemented as one or more of a computer-readable medium or media, a volatile memory unit or units, or a non-volatile memory unit or units. Expansion memory may also be provided and connected to distributed computing components 140 through an expansion interface (not shown), which may include, for example, a SIMM (Single In Line Memory Module) card interface. Such expansion memory may provide extra storage space for distributed computing components 140 or may also store applications or other information therein. In some embodiments, expansion memory may include instructions to carry out or supplement the processes described above and may include secure information also. For example, expansion memory may be provided as a security module for distributed computing components 140 and may be programmed with instructions that permit secure use of distributed computing components 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

As described above, the embodiments of the present disclosure may be described with reference to a data security model (e.g., a global information model, logical data model, or the like) that is formed of a plurality of data objects associated with data entries. The memory 154 described herein may similarly be configured to store, in whole or in part, the data security model (e.g., model 200 in FIG. 2). In some embodiments, each data object forming the data security model may be stored by the memory 154 (e.g., a commonly stored model). In other embodiments, portions of the data security model may be collectively stored by the components forming the memory 154.

In some embodiments, the user may use the distributed computing components 140 to transmit and/or receive information or commands to and from the system 130 via the network 110. Any communication between the system 130 and the distributed computing components 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the distributed computing components 140 may provide the system 130 (or other client devices) permissioned access to the protected resources of the distributed computing components 140, which may include a GPS device, an image capturing component (e.g., camera), a microphone, and/or a speaker.

The distributed computing components 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to distributed computing components 140, which may be used as appropriate by applications running thereon, and in some embodiments, one or more applications operating on the system 130.

The distributed computing components 140 may also communicate audibly using audio codec 162, which may receive spoken information from a user and convert it to usable digital information. Audio codec 162 may likewise generate audible sound for a user, such as through a speaker, e.g., in a handset of distributed computing components 140. Such sound may include sound from voice telephone calls, may include recorded sound (e.g., voice messages, music files, etc.) and may also include sound generated by one or more applications operating on the distributed computing components 140, and in some embodiments, one or more applications operating on the system 130.

Various implementations of the distributed computing environment 100, including the system 130 and distributed computing components 140, and techniques described here may be realized in digital electronic circuitry, integrated circuitry, specially designed ASICs (application specific integrated circuits), computer hardware, firmware, software, and/or combinations thereof.

Figure 2:
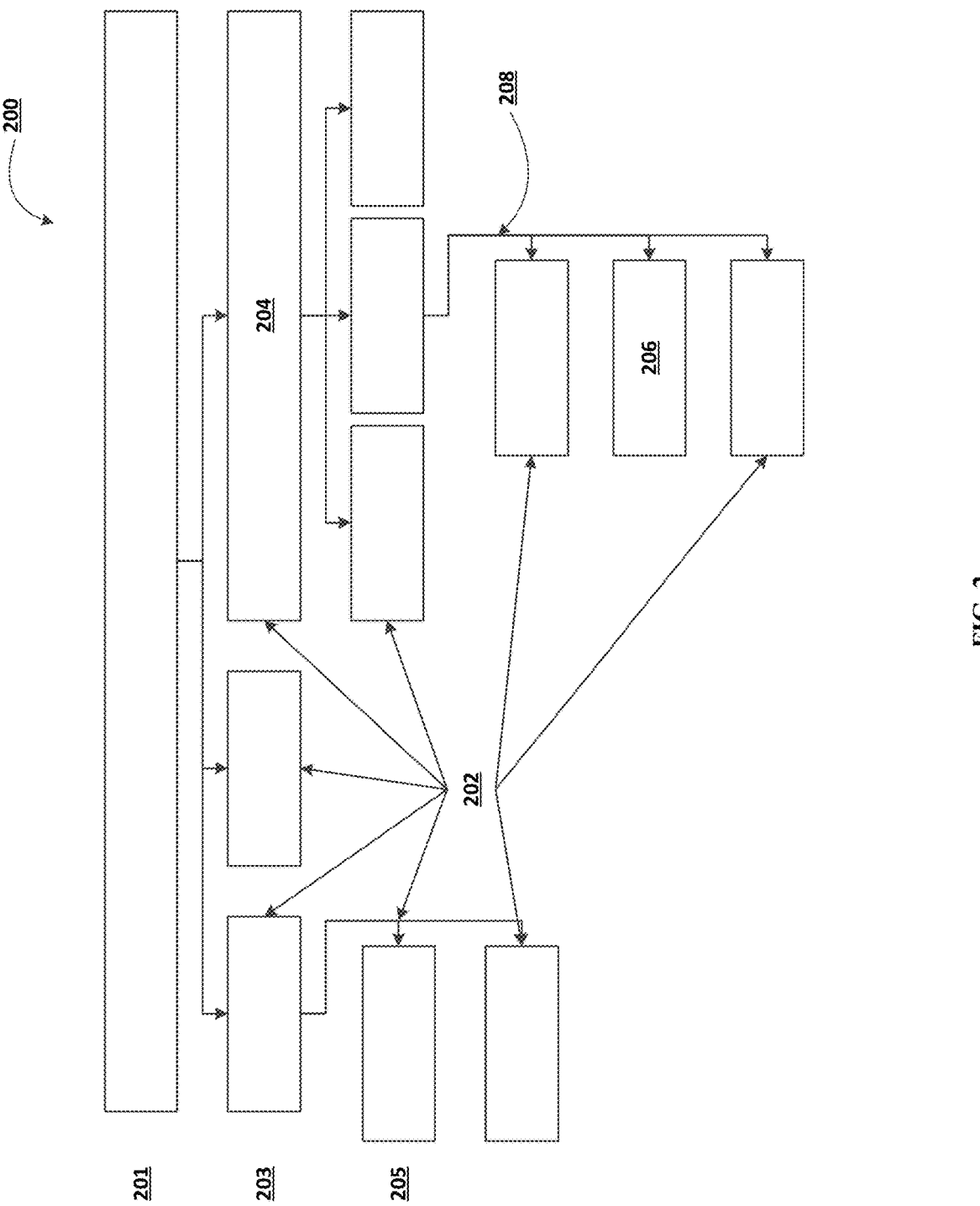
FIG. 2 illustrates an example visualization of a portion of an example data security model in accordance with one or more embodiments of the present disclosure.

FIG. 2 illustrates an example visualization of a portion of an example data security model 200. As shown, the data security model 200 may be formed of a plurality of data objects 202, and each of these data objects 202 may include, define, or otherwise be associated with one or more data entries. As would be evident to one of ordinary skill in the art in light of the present disclosure, a data object 202 may refer to a collection of electronically managed data that is associated with any number data entries based on the intended application of the data security model 200. By way of example, the data objects 202 may include electronically maintained documents, data records, and/or computing files of any type, configuration, or format. In some instances, the data objects of the data security model 200 may be associated with a second format that defines the structure, organization, form, and/or the like of the data entries forming the data objects 202. In any embodiment, the data objects 202 may be modifiable, manipulatable, or otherwise capable of dynamic updating as described herein with reference to the operations of FIGS. 3-5.

By way of a non-limiting example, the data security model 200 may operate as a global information model (e.g., a logical data model) that creates a common definition database for information security and technology infrastructure implementations. As shown, the data security model 200 may be hierarchical in nature in that particular data objects 202 may exist at particular levels in the data security model 200. Said differently, each data object 202 may define an associated model level indicative of the hierarchical position of the data object 202 within the data security model 200. The data security model 200 may, for example, include a first level 201, a second level 203, and/or a third level 205. With continued reference to an example global information model implementation, the first level 201 may be associated with a particular subject matter area, the second level 203 may be associated with a particular topic or concept, and the third level 205 may be associated with a particular functionality, capability, and/or product feature. Although FIG. 2 illustrates an example portion of the data security model 200, the present disclosure contemplates that the number of data objects 202 forming the data security model 200 may vary based upon the applications, systems, implementation, subject matter(s), etc. defined by the data security model 200. By way of a non-limiting example, the data security model 200 may be associated with hundreds of topics, concepts, subject matters, etc. at varying levels 201, 203, 205 within the data security model 200.

Although described herein with reference to an implementation in which the data security model 200 operates, at least in part, as a logical data model, the present disclosure contemplates that the data security model modification and anomaly detection described herein may be applicable to any implementation, industry, application, entity, or the like without limitation. Furthermore, although described herein with reference to modifications to the data security model 200, the present disclosure contemplates that such modifications may further refer to modifications to other models, data structures, etc. that are associated with the data security model 200. By way of continued example, the data security model 200 may operate as a logical data model that defines and/or illustrates various subject matters, topics, concepts, etc. as described herein. In such an embodiment, the present disclosure contemplates that the data security model (e.g., logical data model) may be further associated with one or more other data models that define the way in which the data security model is stored, permissioned, accessed, etc. Said differently, the present disclosure contemplates that the data security model 200 may encompass or comprise any number of these associated data models such that the operations described hereinafter with reference to FIGS. 3-5 may also include relevant operations on the associated data models.

With continued reference to FIG. 2, the data security model 200 may further include one or more links between the data objects 202 that define data object interdependency parameters. As would be evident to one of ordinary skill in the art in light of the present disclosure, the data objects 202 forming the data security model 200 may be interconnected, linked, or otherwise include dependencies. As described hereinafter with reference to the operations of FIG. 3, for example, the data security model 200 may include a first data object 204 and a second data object 206. By way of a non-limiting example, the first data object 204 may be associated with a first topic, and the second data object 206 may be associated with a first concept. As shown, the first data object 204 may be linked or otherwise connected with the second data object 206 via a first link 208 such that a modification in the underlying data entries that of the first data object 204 may result in modification to the underlying data entries of the second data object 206. By way of a non-limiting example, the first data object 204 may be modified (e.g., in response to a model input or otherwise) to include a new concept, topic, etc. In an instance in which the second data object 206 includes data entries associated with permissions, controls, etc. that are implicated by the new concept, topic, etc., the second data object 206 may be modified to account for this new concept, topic, etc.

The one or more links of the data security model 200 (e.g., the first link 208 or the like) may further define data object interdependency parameters that define and/or control the connection(s) between data objects 202. The interdependency parameters may, for example, include instructions that define the order, structure, etc. of the data objects 202 (e.g., as defined by their respective links) in the data security model 200. In some instances, the interdependency parameters may include instructions that define how linked data objects 202 are modified. For example, the first set of interdependency parameters of the first link 208 may include instructions that cause the second data object 206 to be, at least in part, modified in an instance in which the first data object 204 is modified. Although illustrated in FIG. 2 as a singular connection (e.g., the first link 208) between the first data object 204 and the second data object 206, the present disclosure contemplates that the first data object 204 and/or the second data object 206 may be linked with any number of other data objects 202. Furthermore, each of the data objects 202 that form the data security model 200 may have any number of links to the same and/or different data objects 202 based upon the intended application of the data security model 200. The present disclosure further contemplates that the links between data objects 202 and the associated interdependency parameters may be dynamically modified (e.g., increased, removed, etc.) as the number of data objects 202 that form the data security model 200 changes. As described hereinafter with reference to FIG. 5, for example, the inclusion of a new data object 202 may cause modification to existing links and/or cause the creation of new links.

As described above, the data security model 200 may further include data objects 202 that are associated with various functionalities, capabilities, etc. By way of continued example, the data security model 200 may be associated with a logical data model that includes various topics, concepts, etc. In such an embodiment, the data security model 200 may include a topic that at the first level 201 that is associated with cybersecurity, such that the first data object 204 may be associated with a particular concept within cybersecurity, and the second data object 206 may be associated with a particular application within the cybersecurity concept. In such an example implementation, the functionality of the particular application may be associated with various security protocols, permissions, access limitations, and/or the like. As described hereafter with reference to FIG. 4, a modification to the data security model 200 may result in a modification to one or more access levels associated with one or more applications of the data objects 202 forming the data security model 200. As such, the embodiments described herein may operate to revoke access to user account credentials that fail to satisfy the access level requirements as modified. In doing so, the data security model 200 may operate as a system for dynamically modified user access permissions responsive to dynamic modifications to the data security model 200.

FIG. 3 illustrates a flowchart containing a series of operations for data security model modification and anomaly detection (e.g., method 300). The operations illustrated in FIG. 3 may, for example, be performed by, with the assistance of, and/or under the control of an apparatus (e.g., system 130, distributed computing components 140, etc.), as described above. In this regard, performance of the operations may invoke one or more of the components described above with reference to FIGS. 1A-1C (e.g., processor 102, processor 152, etc.).

As shown in operation 302, the system 130 may be configured to receive a model input associated with one or more data entries of a data security model 200. In some embodiments, the system 130 may receive the model input from one or more distributed computing components forming the system 130 or otherwise associated with the system 130. By way of example, a distributed computing component may generate, access, determine, or otherwise cause a model input to be provided to the system 130. In some embodiments, the model input may be provided to the system 130 in response to a request for model inputs by the system 130. For example, the system 130 may be configured to periodically request model inputs from one or more of the distributed computing components forming the system 130 or otherwise communicably coupled with the system 130. In such an embodiment, the system 130 may operate to automatically, as defined by applicable system parameters, polling rates, etc., update the data security model 200. Furthermore, the receipt of the model input at operation 302 may occur iteratively in that the model inputs are iteratively provided to the system 130. Although described hereinafter with reference to model input that is associated with one or more data entries of the data security model 200, the present disclosure contemplates that the model input may, in some instances, comprise a collection of model inputs that are received by the system 130 from the same and/or different sources. For example, the system 130 may be configured to compile inputs from a variety of sources that may collectively be referred to as the model input.

The model input received at 302 may include data of any type, configuration, structure, etc. that may be associated with the data entries of the data security model 200 (e.g., forming the data objects 202). By way of continued example, the data security model 200 may be associated with a logical data model that is formed of a plurality of data objects 202 corresponding to hierarchically positioned topics, concepts, applications, etc. As such, in some embodiments, the model input received at operation 302 may be associated with data entries of one or more topics, concepts, applications, etc. that form the data security model 200. By way of a non-limiting example, the model input received at operation 302 may include new definitions for a particular concept associated with one or more data objects 202 of the data security model 200. By way of an additional, non-limiting example, the model input received at operation 302 may refer to a new capability, functionality, or the like of one or more applications associated with one or more data objects 202 of the data security model 200. As described hereinafter with reference to FIG. 5, in some embodiments, the model inputs received at operation 302 may be associated with one or more data entries that are absent from the data security model 200 (e.g., new data entries). In such an embodiment, the data security model 200 may be updated by generating one or more new data objects 202 with associated links.

Thereafter, the system 130 may be configured to access the data security model 200. As described above, the data security model 200 may be formed of a plurality of data objects 202, and each of these data objects 202 may include, define, or otherwise be associated with one or more data entries. The data objects 202 that form the data security model 200 may be a collection of electronically managed data that is associated with any number data entries based on the intended application of the data security model 200. By way of example, the data objects 202 may include electronically maintained documents, data records, and/or computing files of any type, configuration, or format. As such, accessing the data security model 200 may refer to any operation by which the system 130 may retrieve the data entries stored by the data security model 200.

In some embodiments, the system 130 may, via the memory 104 or the like, store the data security model 200 such that accessing the data security model 200 at operation 304 refers to one or more internal transmissions by the system 130. Additionally or alternatively, in some embodiments, the data security model 200 may be stored by one or more databases, repositories, or other similar structures. As such, accessing the data security structure 200 at operation 304 may refer to one or more transmissions between the system 130 and the databases, repositories, etc. For example, the system 130 may transmit an access request to a database storing the data security model 200 in order to retrieve the data objects 202 and underlying entries forming the data security model 200. The present disclosure contemplates that the system 130 may employ any number of distinct and/or integrated operations to access the data security model 200 based upon the intended application of the system 130.

Thereafter, as shown in operation 306, the system 130 may be configured to determine one of more data objects of the data security model 200 implicated by the model input. As described above, the model input received at 302 may include data of any type, configuration, structure, etc. that may be associated with the data entries of the data security model 200 (e.g., forming the data objects 202), such as data entries of one or more topics, concepts, applications, etc. that form the data security model 200. In some embodiments, the model inputs received at operations 302 may further include one or more instructions that identify the data objects 202 to be modified and/or the nature of the modifications. By way of example, the model input may identify a particular concept, application, or functionality for updating in the data security model 200, such as by including data entries that denote that concept, application, functionality, etc. associated with the model input.

In other embodiments, the system 130 may analyze the model inputs to determine one or more data objects 202 of the data security model 200 that are implicated by the model inputs. By way of example, the model inputs received at operation 302 may be associated with new functionality offered by a particular application. The system 130 may, therefore, analyze the data entries defining the data objects 202 that form the data security model 200 to determine data objects that may be associated with this new functionality. For example, the system 130 may determine that the first data object 204 is associated with the application having the new functionality, such that the first data object 204 is implicated by the model input as described hereafter with reference to operations 308 and 310. In some embodiments, the system 130 may employ various machine learning or artificial intelligence based techniques in order to determine the one or more data objects implicated by the model input. By way of a non-limiting example, the model inputs may be received in a first format (e.g., natural language or free text input), such that the system 130 may employ machine learning techniques to translate the model inputs to a second format (e.g., structured data or other structure) used by the data security model 200. The present disclosure contemplates that the system 130 may leverage machine learning techniques or systems of any type.

The ML algorithms contemplated, described, and/or used herein (e.g., the trained ML model) may include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML models may be trained using repeated execution cycles of experimentation, testing, and tuning to modify the performance of the ML algorithm and refine the results in preparation for deployment of those results for consumption or decision making. The ML models may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model is the measurement used to determine which set of hyperparameters is best at identifying relationships and patterns between variables in a dataset based on the input, or training data. A fully trained ML model is one whose hyperparameters are tuned and model accuracy maximized.

As shown in operations 308-314, the system 130 may, in some embodiments, be configured to modify one or more data entries of the one or more implicated data objects of the data security model 200 in response to the model input. With reference to a particular data object, the system 130 may be configured to determine a first data object 204 of the data security model 200 implicated by the model input operation 308 and modify one or more data entries of the first data object 204 in response to the model input at operation 310. By way of continued example, the first data object 204 may be associated with a particular concept, such as a cybersecurity concept, that may be implicated by the model input received at operation 302 that is associated with a new functionality of a particular application. The system 130 may determine that the particular concept is associated with the application having the new functionality and modify the data entries of the first data object 204 to reflect this new functionality for the associated application. In this way, the embodiments of the present disclosure may dynamically modify the data security model 200 to ensure that the model 200 remains encompassing and relevant as the entity associated with the data security model 200 evolves.

Thereafter, as shown in operations 312 and 314, the system 130 may be configured to determine a second data object 206 of the data security model 200 based upon a first set of data object interdependency parameters of a first link 208 between the first data object 204 and the second data object 206 and modify one or more data entries of the second data object 206. The one or more links of the data security model 200 (e.g., the first link 208 or the like) may further define data object interdependency parameters that define and/or control the connection(s) between data objects 202. In some instances, the interdependency parameters may include instructions that define how linked data objects 202 are modified. For example, the first set of interdependency parameters of the first link 208 may include instructions that cause the second data object 206 to be, at least in part, modified in an instance in which the first data object 204 is modified. As such, the system 130 may analyze the inter-dependency parameters of the first link 208 to determine that a modification of the first data object 204 may result in a further modification to the second data object 206. At operation 314, the system 130 may effectuate this modifi-cation to the second data object 206.

As described above, the embodiments of the present disclosure may further operate to provide novel anomaly detection features, such as discrepancies between the data security model 200 and $3^{rd}$ party products. By way of a non-limiting example, the system 130 may receive an input of a particular product, application, and/or the like, and the system 130 may compare the various topics, concepts, applications, functionalities, etc. that are associated with the received product with the various data objects 202 of the data security model 200. In doing so, the system 130 may operate to identify particular omissions, deficiencies, etc. associated with the received product. The system 130 may, for example, determine that the received product has a particular set of applications having associated functionali-ties. The system 130 may compare these applications and functionalities with the data objects 202 of the data security model 200 to identify permissions, controls, etc. associated with these particular set of applications and associated functionalities of the data security model 200. The system may, for example, identify particular controls or permissions that are absent from the received product and generate remediation recommendations (e.g., recommended permis-sions, controls, etc.) for modifying the received product. The present disclosure contemplates that the data security model 200 may be compared with various products, systems, applications, etc. without limitation.

FIG. 4 illustrates a flowchart containing a series of operations for functionality determinations and associated access revocation (e.g., method 400). The operations illus-trated in FIG. 4 may, for example, be performed by, with the assistance of, and/or under the control of an apparatus (e.g., system 130, distributed computing components 140, etc.), as described above. In this regard, performance of the opera-tions may invoke one or more of the components described above with reference to FIGS. 1A-1C (e.g., processor 102, processor 152, etc.).

As shown in operation 402, in some embodiments, the system 130 may be configured to translate a first data format of the model input to a second data format of the data security model 200. As described above, the model inputs may be received in a first format (e.g., natural language or free text input), such that the system 130 may employ machine learning techniques to translate the model inputs to a second format (e.g., structured data or other configuration) used by the data security model 200. The present disclosure contemplates that the system 130 may leverage machine learning techniques or systems of any type in order to convert between data formats. In some instances, the con-version between data formats may be performed in the absence of machine learning techniques or systems, such as in instances in which the model input includes data entries in an unstructured form (e.g., the first format), and the data security model 200 includes data in a structure form (e.g., the second format).

As shown in operation 404, the system 130 may be configured to determine that at least one of the data objects 202 of the data security model 200 implicated by the model input includes one or more data entries defining one or more functionalities associated with the implicated data object. In such an embodiment, the system 130 may be configured to modify the one or more functionalities associated with the implicated data object. As described above, the model inputs received at operation 302 may be associated with new functionality or capability offered by a particular application and/or a modification to an existing functionality or capa-bility offered by a particular application. The system 130 may, therefore, analyze the data entries defining the data objects 202 that form the data security model 200 to deter-mine data objects 202 that include data entries defining one or more functionalities that are implicated by the model inputs. By way of example, the first data object 204 may include data entries indicative of operations with a first application that includes the functionality that is also asso-ciated with the model input.

Thereafter, the system 130 may be configured to modify the one or more functionalities associated with the impli-cated data object based upon the model input as shown in operation 406. By way of continued example, the system 130 may determine that the first data object 204 is implicated by the model input (e.g., associated with a functionality modification defined by the model input). In an instance in which the model input defines a new functionality, the one or more data entries of the first data object 204 (e.g., the example implicated data object 202) may be modified to account for this new functionality. Said differently, the data entries defining the first data object 204 may include new data entries associated with the new functionality. In an instance in which the model input defines a modification to an existing functionality, the one or more data entries of the first data object 204 associated with this existing function-ality (e.g., the example implicated data object 202) may be modified to account for these modifications. By way of example, the first data object 204 may include one or more existing data entries associated with the functionality that is modified by the model input, and these data entries may be updated to account for the modification as defined by the model input. The present disclosure contemplates that the one or more links (e.g., first link 208 or the like) associated with the modified data object 202 (e.g., the example first data object 204) may similarly be modified (e.g., modifica-tion to one or more interdependency parameters) to account for these modifications.

Thereafter, as shown in operation 408, the system 130 may be configured to determine that the modification of the one or more functionalities associated with the implicated data object 202 modifies an access level of an application associated with the implicated data object 202. By way of example, various applications that are associated with the data security model 200 may be associated with security controls that at least partially limit the ability of users, systems, subsystems, devices, etc. to access these applica-tions. In some embodiments, these controls may define an access level of a particular application (e.g., an access level of an associated data object 202) that limits access to the particular application to requests that satisfy the particular access level. As shown in operation 408, modification to one or more functionalities of a data object 202 may result in a modification to an access level of the application associated with the data object 202. By way of example, the model input may include data entries that provide a new functionality to the first data object 204 (e.g., the implicated data object 202), and the new functionality may have increased security concerns, controls, permissions, etc. As such, the system 130 may determine that the modification of the functionalities of the implicated data object 202 (e.g., the new functionality) modifies an access level associated with the data object 202 (e.g., increases the required credential level to access the data object).

Thereafter, as shown in operation 410, the system may determine a user account credential attempting to access the implicated data object. By way of continued example in which the first data object 204 is associated with the modified functionality, the system 130 may periodically receive requests to interact with various applications associated with the system 130. A user, subsystem, user device, etc. may, for example, transmit a request to the system 130 to interact with one or more applications that are associated with the example first data object 204. In some instances, prior to modification to the first data object (e.g., the implicated data object 202), the system 130 may provide access to the requesting user, device, subsystem, etc. in an instance in which the access level of the user account credential satisfies the access level associated with the first data object 204. As shown in operation 412, however, the system 130 may operate to revoke access by the user account credential to the implicated data object in an instance in which an access level associated with the user account credential fails to satisfy the modified access level of the application. As described above, the modification to the functionalities of the implicated data object 202 (e.g., the example first data object 204), may modify the access level of the implicated data object 202. As such, this modification may result in the revocation of access to user credentials (e.g., particular users, systems, subsystems, devices, etc.) that no longer possess the requisite access level after modification. In this way, the system 130 may operate to dynamically modify security controls, permissions, and/or the like to account for the dynamic modifications to the data security model 200.

In some embodiments, as shown in operation 414, the system 130 may operate to generate a user notification comprising a representation of the modifications to the one or more data entries of the one or more implicated data objects 202. As described above with reference to FIG. 2, the data security model 200 may be provided as a visual representation or illustration that may be accessed by a user. The dynamic modifications to the data security model 200 described herein may also be illustrated to a user, such that the data security model 200 of FIG. 2 operates as a dynamic visualization that is updated in substantially real-time. The present disclosure contemplates that the form, format, orientation, relative positioning of data objects 202, and/or the like of the visualization of the data security model 200 may vary based on the intended application of the data security model 200.

FIG. 5 illustrates a flowchart containing a series of operations for example new data object generation (e.g., method 500). The operations illustrated in FIG. 5 may, for example, be performed by, with the assistance of, and/or under the control of an apparatus (e.g., system 130, distributed computing components 140, etc.), as described above. In this regard, performance of the operations may invoke one or more of the components described above with reference to FIGS. 1A-1C (e.g., processor 102, processor 152, etc.).

As shown in operation 502, the system 130 may be configured to determine that the model input comprises one or more data entries that are absent from the data security model 200. As described above, in some instances, the model input may include various data entries that are not contained within the data security model 200. The model input, for example, may include a new topic, concept, input, application, functionality, etc. that is not included in the data entries defining the data objects 202 that form the data security model 200. In some instances, the model input may indicate (e.g., explicitly or implicitly) that the data entries of the model input are absent from the data security model 200. In other instances, the system 130 may compare the data entries of the model input with the data security model 200 and identify that the data entries received via the model input are absent from the data security model 200.

In some embodiments, as shown in operation 504, the system 130 may generate a new data object 202 that comprises the one or more data entries of the model input. By way of example, the data entries of the model input that are absent from the data security model 200 may be associated with a new topic, concept, etc. such that a new data object 202 is required to include the new data entries in the data security model 200. Said differently, in some embodiments, the existing data objects 202 of the data security model 200 may be distinct from the data entries of the model input such that generation of a new data object 202 is required.

Thereafter, as shown in operations 506 and 508, the system 130 may define an associated model level indicative of the hierarchical position of the new data object within the data security model 200 and generate one or more links between the data objects of the data security model and the new data object defining data object interdependency parameters for the new data object. As described above, the data security model 200 may be hierarchical in nature in that particular data objects 202 may exist at particular levels in the data security model 200. Said differently, each data object 202 may define an associated model level indicative of the hierarchical position of the data object 202 within the data security model 200. The data security model 200 may, for example, include a first level 201, a second level 203, and/or a third level 205. At operation 506, the system 130 may define a model level for the new data object 202 based upon the nature of the new data object. Similarly, the system may generate links between the new data object and existing data objects based upon the nature of the new data object.

In other embodiments, as shown in operations 510 and 512, the system 130 may be configured to determine one of more data objects of the data security model 200 implicated by the absent data entries of the model input and modify one or more data entries of the one or more implicated data objects of the data security model 200 to include the absent data entries. In some instances, one or more existing data objects 202 of the data security model 200 may be appropriate for updating to including the new data entries of the model input. In such an embodiment, the system 130 may perform operations similar to those described with reference to FIG. 3 to update one or more data objects 202 to account for the absent data entries.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Further-more, embodiments of the present disclosure may take the form of a computer program product that includes a com-puter-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable program-mable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-ori-ented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural program-ming languages, such as the "C" programming languages and/or similar programming languages. The computer pro-gram code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illus-trations and/or block diagrams, and combinations of blocks included in the flowchart illustrations and/or block dia-grams, may be implemented by one or more computer-executable program code portions. These computer-execut-able program code portions execute via the processor of the computer and/or other programmable data processing appa-ratus and create mechanisms for implementing the steps and/or functions represented by the flowchart(s) and/or block diagram block(s).

It will also be understood that the one or more computer-executable program code portions may be stored in a tran-sitory or non-transitory computer-readable medium (e.g., a memory, and the like) that may direct a computer and/or other programmable data processing apparatus to function in a particular manner, such that the computer-executable pro-gram code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable appa-ratus provide operational steps to implement the steps speci-fied in the flowchart(s) and/or the functions specified in the block diagram block(s). Alternatively, computer-imple-mented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and sub-stitutions, in addition to those set forth in the above para-graphs, are possible. Those skilled in the art will appreciate that various adaptations and modifications of the just described embodiments may be configured without depart-ing from the scope and spirit of the disclosure. Therefore, it is to be understood that, within the scope of the appended claims, the disclosure may be practiced other than as spe-cifically described herein.

What is claimed is:

1. A system for data security model modification and anomaly detection, the system comprising:

at least one non-transitory storage device; and at least one processor coupled to the at least one non-transitory storage device, wherein the at least one processor is configured to:

receive a model input associated with one or more data entries of a data security model that define one or more functionalities;

access the data security model, wherein the data secu-rity model comprises:

a plurality of data objects comprising one or more data entries, wherein each data object defines an associated model level indicative of the hierarchi-cal position of the data object within the data security model; and one or more links between the data objects associ-ated with data object interdependency parameters defining the order and structure of the data objects in the data security model;

determine one or more data objects of the data security model implicated by the model input;

determine one or more data objects linked to the data objects that are applicable to the model input;

determine one or more controls defined by the one or more linked data objects, wherein the one or more controls comprise one or more access permissions required to access to the one or more functionalities; and modify one or more data entries of the one or more implicated data objects of the data security model in response to the model input.

2. The system of claim 1, wherein the processor is further configured to:

determine a first data object of the data security model implicated by the model input; and modify one or more data entries of the first data object in response to the model input.

3. The system of claim 2, wherein the processor is further configured to:

determine a second data object of the data security model based upon a first set of data object interdependency parameters of a first link between the first data object and the second data object; and modify one or more data entries of the second data object.

4. The system of claim 1, wherein the processor is further configured to modify the one or more functionalities associated with the implicated data object.

5. The system of claim 4, wherein the processor is further configured to:

determine that the modification of the one or more functionalities associated with the implicated data object modifies an access level of an application associated with the implicated data object;

determine a user account credential attempting to access the implicated data object; and revoke access by the user account credential to the implicated data object in an instance in which an access level associated with the user account credential fails to satisfy the modified access level of the application.

6. The system of claim 1, wherein the model input comprises one or more data entries that are absent from the data security model, wherein the processor is further configured to:

generate a new data object that comprises the one or more data entries of the model input;

define an associated model level indicative of the hierarchical position of the new data object within the data security model; and generate one or more links between the data objects of the data security model and the new data object defining data object interdependency parameters for the new data object.

7. The system of claim 1, wherein the model input comprises one or more data entries that are absent from the data security model, wherein the processor is further configured to:

determine one or more data objects of the data security model implicated by the absent data entries of the model input; and modify one or more data entries of the one or more implicated data objects of the data security model to include the absent data entries.

8. The system of claim 1, wherein the model input is associated with a first data format and the data entries of the data object forming the data security model are associated with a second data format that is different from the first data format, wherein the processor is further configured to translate the first data format to the second data format.

9. The system of claim 1, wherein the one or more linked data objects of the data security model are associated with the one or more functionalities, and the one or more determined data objects of the data security model are not associated with the one or more functionalities.

10. A computer program product for data security model modification and anomaly detection, the computer program product comprising a non-transitory computer-readable medium comprising code that, when executed, causes an apparatus to:

receive a model input associated with one or more data entries of a data security model that define one or more functionalities;

access the data security model, wherein the data security model comprises:

a plurality of data objects comprising one or more data entries, wherein each data object defines an associated model level indicative of the hierarchical position of the data object within the data security model; and one or more links between the data objects associated with data object interdependency parameters defining the order and structure of the data objects in the data security model;

determine one or more data objects of the data security model implicated by the model input;

determine one or more data objects linked to the data objects that are applicable to the model input;

determine one or more controls defined by the one or more linked data objects, wherein the one or more controls comprise one or more access permissions required to access to the one or more functionalities; and modify one or more data entries of the one or more implicated data objects of the data security model in response to the model input.

11. The computer program product of claim 10, wherein the apparatus is further configured to:

determine a first data object of the data security model implicated by the model input; and modify one or more data entries of the first data object in response to the model input.

12. The computer program product of claim 11, wherein the apparatus is further configured to:

determine a second data object of the data security model based upon a first set of data object interdependency parameters of a first link between the first data object and the second data object; and modify one or more data entries of the second data object.

13. The computer program product of claim 10, wherein the apparatus is further configured to modify the one or more functionalities associated with the implicated data object.

14. The computer program product of claim 13, wherein the apparatus is further configured to:

determine that the modification of the one or more functionalities associated with the implicated data object modifies an access level of an application associated with the implicated data object;

determine a user account credential attempting to access the implicated data object; and revoke access by the user account credential to the implicated data object in an instance in which an access level associated with the user account credential fails to satisfy the modified access level of the application.

15. The computer program product of claim 10, wherein the model input comprises one or more data entries that are absent from the data security model, wherein the apparatus is further configured to:

generate a new data object that comprises the one or more data entries of the model input;

define an associated model level indicative of the hierarchical position of the new data object within the data security model; and generate one or more links between the data objects of the data security model and the new data object defining data object interdependency parameters for the new data object; or

determine one or more data objects of the data security model implicated by the absent data entries of the model input; and modify one or more data entries of the one or more implicated data objects of the data security model to include the absent data entries.

16. A method for data security model modification and anomaly detection, the method comprising:

receiving a model input associated with one or more data entries of a data security model that define one or more functionalities;

accessing the data security model, wherein the data security model comprises:

a plurality of data objects comprising one or more data entries, wherein each data object defines an associated model level indicative of the hierarchical position of the data object within the data security model; and one or more links between the data objects associated with data object interdependency parameters defining the order and structure of the data objects in the data security model;

determining one or more data objects of the data security model implicated by the model input;

determining one or more data objects linked to the data objects that are applicable to the model input;

determining one or more controls defined by the one or more linked data objects, wherein the one or more controls comprise one or more access permissions required to access to the one or more functionalities; and modifying one or more data entries of the one or more implicated data objects of the data security model in response to the model input.

17. The method of claim 16, further comprising:

determining a first data object of the data security model implicated by the model input; and modifying one or more data entries of the first data object in response to the model input.

18. The method of claim 17, further comprising:

determining a second data object of the data security model based upon a first set of data object interdependency parameters of a first link between the first data object and the second data object; and modifying one or more data entries of the second data object.

19. The method of claim 16, wherein the model input comprises one or more data entries that are absent from the data security model, the method further comprising:

generating a new data object that comprises the one or more data entries of the model input;

defining an associated model level indicative of the hierarchical position of the new data object within the data security model; and generating one or more links between the data objects of the data security model and the new data object defining data object interdependency parameters for the new data object.

20. The method of claim 16, wherein the model input comprises one or more data entries that are absent from the data security model, the method further comprising:

determining one or more data objects of the data security model implicated by the absent data entries of the model input; and modifying one or more data entries of the one or more implicated data objects of the data security model to include the absent data entries.

* * * * *